(12) United States Patent
Kohl et al.

(10) Patent No.: US 7,799,919 B2
(45) Date of Patent: *Sep. 21, 2010

(54) WATER-SOLUBLE, FLUORESCENT PERYLENETETRACARBOXYLIC ACID BISIMIDES

(75) Inventors: Christopher Kohl, Mainz (DE); Jianqiang Qu, Mannheim (DE); Klaus Müllen, Köln (DE)

(73) Assignee: Max-Planck-Gesellschaft zur Forderung der Wissenschaften e.V., Munich (DE)

( * ) Notice: Subject to any disclaimer, the term of this patent is extended or adjusted under 35 U.S.C. 154(b) by 1027 days.

This patent is subject to a terminal disclaimer.

(21) Appl. No.: 10/547,521

(22) PCT Filed: Feb. 27, 2004

(86) PCT No.: PCT/EP2004/001970

§ 371 (c)(1), (2), (4) Date: Sep. 18, 2006

(87) PCT Pub. No.: WO2004/076562

PCT Pub. Date: Sep. 10, 2004

(65) Prior Publication Data

US 2007/0004919 A1    Jan. 4, 2007

(30) Foreign Application Priority Data

Feb. 28, 2003    (DE) ............................ 103 08 940

(51) Int. Cl.
*C07D 471/02* (2006.01)
*C07D 471/08* (2006.01)

(52) U.S. Cl. ........................................ 546/37; 546/36
(58) Field of Classification Search ............... 546/37, 546/36

See application file for complete search history.

(56) References Cited

FOREIGN PATENT DOCUMENTS

| DE | 37 03 513 A | 8/1988 |
|---|---|---|
| EP | 0 227 980 A | 7/1987 |
| EP | 0 504 872 A | 9/1992 |
| WO | WO 02/14414 A | 2/2002 |

*Primary Examiner*—Charanjit S Aulakh
(74) *Attorney, Agent, or Firm*—Sutherland Asbill & Brennan LLP

(57) ABSTRACT

The invention relates to novel perylenetetracarboxdiimide derivatives with improved performance properties.

12 Claims, 2 Drawing Sheets

WATER-SOLUBLE, FLUORESCENT PERYLENETETRACARBOXYLIC ACID BISIMIDES

CROSS REFERENCE TO RELATED APPLICATIONS

This application claims the priority benefit of PCT/EP2004/001970 filed on Feb. 27, 2004 and German Application 103 08 940.1 filed on Feb. 28, 2003.

The invention relates to novel perylenetetracarboxdiimide derivatives having improved performance properties.

Perylenetetracarboxdiimides are known for their exceptional thermal, chemical and photophysical stability (1). They are used as dyes and pigments, for example in reprographic processes (2), fluorescent solar collectors (3), photovoltaic cells (4) and dye lasers (5). Functionalized perylenetetracarboxdiimides can also be used as an initiator or reaction partner for polymerization reactions and can be incorporated into the polymers via covalent bonds (6). A further possible field of application is the use as labeling groups in detection processes, in particular in diagnostic or analytical processes on biological samples, including living cells. Many of these applications are based on the high fluorescence intensity of the perylene chromophore group and on the fact that the fluorescence excitation emission wavelengths of perylenetetracarboxdiimides lie at wavelengths of above 500 nm, at which signal disruptions caused by autofluorescence of cells, biological tissues or biological liquids are negligible.

However, one disadvantage of known perylenetetracarboxdiimides is that they have poor water solubility and/or weak fluorescence intensity in water (7). These disadvantages are brought about mainly by the aggregation of dye molecules in a hydrophilic environment, as a result of which the number of biological applications is limited (8).

DE-A-37 03 513 describes perylenetetracarboxdiimides which have one or more sulfonic acid moieties in the imide structure.

Quante et al. (Macromol. Chem. Phys. 197 (1996), 4029-4044) disclose perylenetetracarboxdiimides which contain sulfonic acid groups on the basic skeleton of the perylene chromophore. Further modified perylenetetracarboxdiimides are described in EP-A-0 648 817, EP-A-0 654 504, U.S. Pat. No. 4,378,302, EP-A-0 869 959, WO 97/22607 and by Zhubanov et al. (Zh. Org. Khim. 28 (1992), 1486-1488).

WO 02/14414 discloses functionalized perylenetetracarboxdiimides which are provided as initiators or/and as reaction partners for polymerization reactions.

These compounds exhibit increased fluorescence in aqueous solutions. However, it has not been possible to fully eliminate the disadvantages of the prior art, in particular the tendency to aggregate formation in aqueous solutions.

There is therefore a great need to provide novel perylenetetracarboxdiimides having improved properties, in particular with regard to the water solubility or/and to the fluorescence intensity in water or aqueous media.

This object is achieved in accordance with the invention by providing perylenetetracarboxdiimides having at least two charged groups on the basic skeleton of the perylene chromophore and space-filling substituents on the imide nitrogen atoms. The compounds prepared in this way exhibit fluorescence quantum yields of up to 80% in water and can optionally be modified by introduction of further functionalities, for example of hydrophilic groups or coupling groups, into the imide structure.

The invention thus provides perylenetetracarboxdiimides of the structural formula (I)

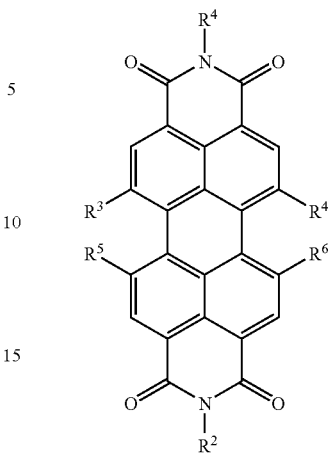

in which $R^1$ and $R^2$ are each independently an organic moiety which is bonded via a secondary or tertiary carbon atom to the imide nitrogen atom, and at least two of $R^3$, $R^4$, $R^5$ and $R^6$ are each independently organic moieties which contain at least one positively or/and negatively charged group.

The $R^1$ and $R^2$ moieties present as part of the imide structure are secondary or tertiary aliphatic moieties or cyclic moieties having typically 3-30 carbon atoms, in particular mono- or bicyclic aromatic or heteroaromatic moieties, for instance phenyl, pyridyl or naphthyl, which optionally bear one or more substituents. Examples of suitable substituents for aliphatic or saturated cyclic moieties are CN, $NO_2$, halogen (e.g. F, Cl, Br or I), OH, $OR^7$, $OCOR^7$, SH, $SR^7$, $SCOR^7$, $SO_2R^7$, CHO, $COR^7$, COOH, COOM, $COOR^7$, $CONH_2$, $CONHR^7$, $CON(R^7)_2$, $SO_3H$, $SO_3M$, $SO_3R^7$, $NH_2$, $NHR^7$ or $N(R^7)_2$, wherein M is a cation, e.g. an alkali metal ion such as sodium, potassium, etc., and $R^7$ is an optionally halogen-substituted $C_1$-$C_6$-alkyl moiety. Cyclic moieties, for example aromatic or heteroaromatic moieties, may additionally be substituted by one or more $R^7$ moieties. In addition, reactive functionalities may be introduced into the $R^1$ or/and $R^2$ moieties in order to enable coupling to biological substances. Examples of such reactive functionalities are active esters, maleimides, isocyanates, sulfonyl halides, carboxylic acid halides, in particular carboxylic acid chlorides, iodoacetamides, aziridines, epoxides, acyl azides and acyl nitriles.

At least two of the $R^3$, $R^4$, $R^5$ and $R^6$ moieties bear at least one charged group. Preferably all four $R^3$, $R^4$, $R^5$ and $R^6$ moieties bear at least one charged group. The charged group is preferably a charged group which is charged in neutral media, for example at pH 7, for example a positively charged group, for instance an amino group or an ammonium group, in particular a quaternized ammonium group, or an alkylated heteroaromatic nitrogen atom, in particular an N-alkylpyridinium, N-alkylquinolinium or N-alkylisoquinolinium group, wherein the alkyl moiety preferably has up to 6 carbon atoms and may optionally be substituted as described above. Examples of suitable negatively charged groups are sulfonic acid or carboxylic acid groups, $SO_3H$ and COOH, and also their $SO_3M$ and COOM salts, where M is a cation, for example an alkali metal ion, for instance potassium or sodium. In addition, $R^3$, $R^4$, $R^5$ or/and $R^6$ may also contain a plurality of identically or oppositely charged groups, amphiphilic groups being formed in the latter case. Particularly preferred amphiphilic groups are heteroaromatic nitrogen atoms which are alkylated by a moiety which bears a —$CO_2H$, —$SO_3H$, —$CO_2M$ or —$SO_3M$ group.

It is also preferred that at least two of the $R^3$, $R^4$, $R^5$ and $R^6$ moieties comprise aromatic or heteroaromatic moieties, in particular monocyclic or bicyclic moieties, for instance phenyl or pyridine.

In a particularly preferred embodiment, at least two of $R^3$, $R^4$, $R^5$ and $R^6$ are represented by the general structural formula (II)

(II)

in which Ar is an aromatic or heteroaromatic moiety which contains at least one charged group as specified above. In the case that perylenetetracarboxdiimides having negative charge carriers are used, at least one of $R^3$, $R^4$, $R^5$ and $R^6$ may have the general structural formula (III):

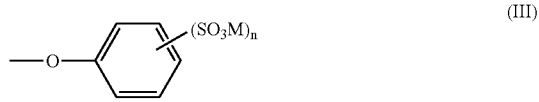
(III)

in which M is a cation and n is 1, 2 or 3.

In the case of the use of perylenetetracarboxdiimides having positive charge carriers, at least one of $R^3$, $R^4$, $R^5$ and $R^6$ may have the general structural formula (IV):

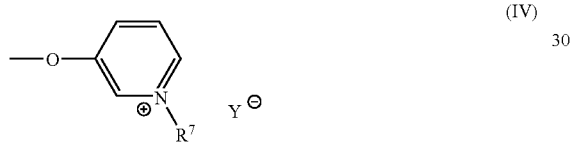
(IV)

in which $R^7$ is an optionally substituted $C_1$-$C_6$-alkyl moiety, preferably $C_1$-$C_4$-alkyl moiety, and Y is an anion, e.g. a halide ion. When the $R^7$ moiety bears a negatively charged group as a substituent, an amphiphilic moiety is obtained.

The inventive perylenetetracarboxdiimides are typically prepared from an industrially readily obtainable di- or tetra-halo-substituted perylenetetracarboxdianhydride by condensation with a primary amine, e.g. $H_2NR^1$ or $H_2NR^2$. The resulting halogen-substituted perylenedi- or -tetracarboxdiimides of the general structural formula (V)

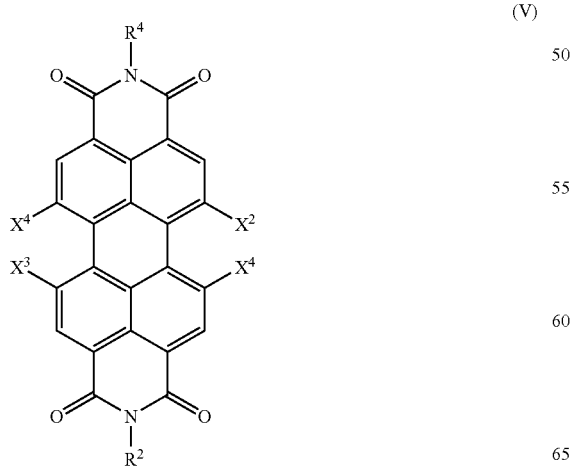
(V)

in which $R^1$ and $R^2$ are as defined above and at least two of $X^1$, $X^2$, $X^3$ and $X^4$ are each halogen, in particular Cl or Br, are subsequently reacted with a compound of the general structural formula (VI)

(VI)

in which Ar' is an aromatic or heteroaromatic moiety. This reaction forms tetra-substituted perylenetetracarboxdiimides of the general structural formula (VIIa) or disubstituted perylenetetracarboxdiimides of the general structural formula (VIIb):

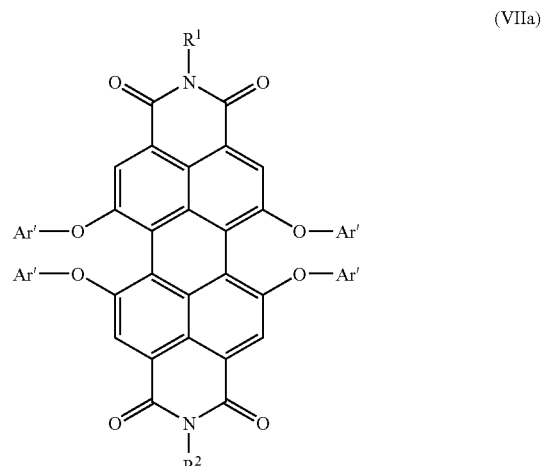
(VIIa)

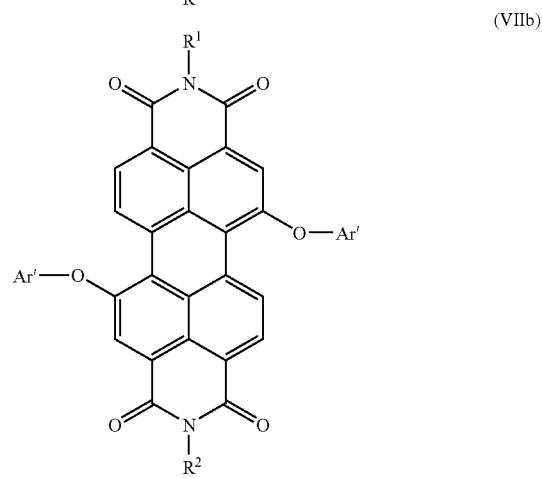
(VIIb)

Subsequently, hydrophilic groups, as specified above, may be introduced into the aromatic or heteroaromatic Ar' moieties. For example, at least one $SO_3H$ or $SO_3M$ group may be introduced into Ar' by reaction with $H_2SO_4$ under suitable conditions. Alternatively, heteroaromatic nitrogen atoms in Ar' may be alkylated, for example by reaction with an alkyl halide, e.g. $CH_3I$, under suitable conditions.

The inventive compounds may be employed in all technical fields suitable for the use of perylenetetracarboxdiimides, for example in dye lasers, as labeling groups in analytical processes, as tracers, in scintillation counters, in fluorescence solar collectors, in liquid crystals, in cold light sources, in materials testing, as photoconductors, in photographic processes, in illumination and display elements, as semiconductors, etc.

The dyes are preferably used in conjunction with a suitable carrier, for example in a concentration of from 0.0005 to 0.5% based on the weight of the carrier. The dyes or conjugates of the dyes, for example covalent conjugates with biomolecules such as nucleic acids, proteins, peptides, saccharides, etc., may be dissolved in liquids, for example organic or/and aqueous solvents, or in solids, for example polymers.

The present invention will be further illustrated by diagrams and examples.

EXAMPLES

Example 1

Figure 1:
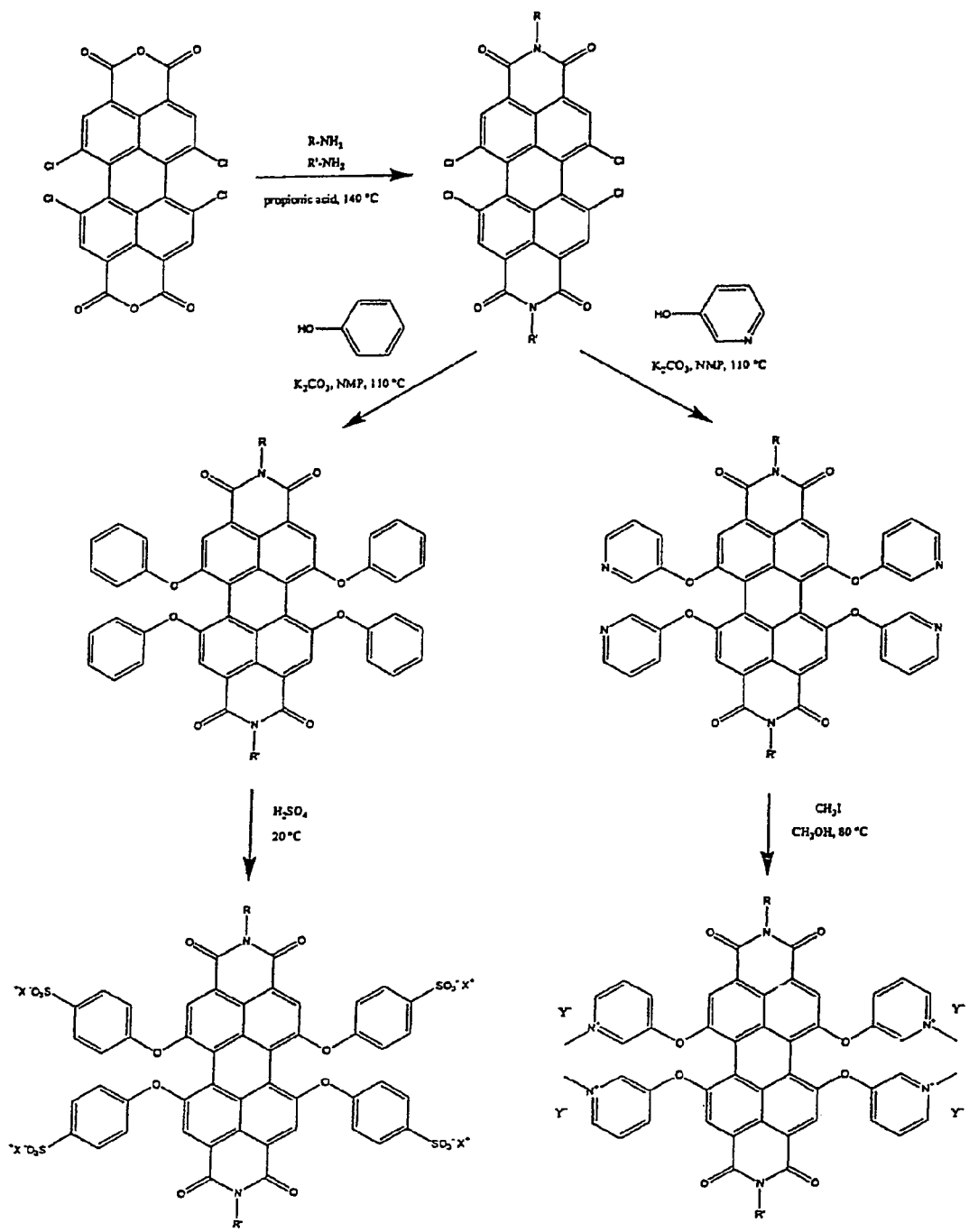
FIG. 1 shows a reaction scheme for the preparation of the tetrasubstituted compounds specified in examples 1-4.
Figure 2:
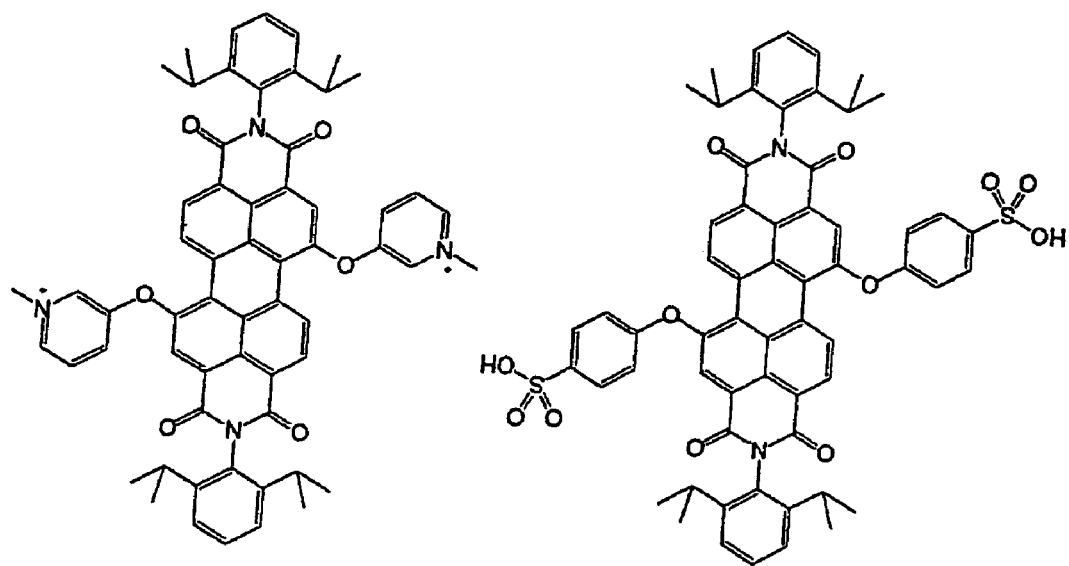
FIG. 2 shows the disubstituted compounds specified in example 5.

Preparation of N,N'-bis(2,6-diisopropylphenyl)-1,6,7,12-tetra(phenoxy)perylene-3,4:9,10-tetracarboxdiimide 5 g (5.9 mmol) of N,N'-bis(2,6-diisopropylphenyl)-1,6,7,12-tetrachloroperylene-3,4:9,10-tetracarboxdiimide, 2.7 g (29 mmol) of phenol and 4 g (29 mmol) of $K_2CO_3$ were suspended under an inert gas atmosphere in 200 ml of N-methylpyrrolidone (NMP). The reaction mixture was heated to 110° C. and stirred for 6 h. After cooling to room temperature, the mixture was poured into 500 ml of an aqueous 2M hydrochloric acid solution. The resulting precipitate was filtered, washed with water to neutrality of the filtrate and dried at 75° C. under reduced pressure. The product was purified further by column chromatography ($SiO_2/CH_2Cl_2$).

Yield 4.9 g (77%) of red solid

M.P.>300° C.; $^1$H NMR (300 MHz, $C_2D_2Cl_4$, 300 K): δ=8.13 (s, 4H), 7.33 (t, $^3J$=7.5 Hz, 2H), 7.24-7.08 (m, 12H), 7.02 (t, $^3J$=7.5 Hz, 4H), 6.93 (d, $^3J$=7.5 Hz, 8H), 2.60 (sept, $^3J$=6.9 Hz, 4H), 1.03 (d, $^3J$=6.9 Hz, 24H); $^{13}$C NMR (75 MHz, $C_2D_2Cl_4$, 300 K): δ=163.50, 156.17, 155.39, 145.68, 133.41, 130.70, 130.31, 129.63, 125.07, 124.22, 122.90, 121.02, 120.48, 120.20, 29.30, 24.42; IR (KBr): ν=3066, 2962, 2868, 2362, 1707, 1675, 1586, 1508, 1487, 1408, 1342, 1311, 1285, 1199, 1074, 1021, 959, 904, 875, 811, 749, 689, 578, 522 cm$^{-1}$; UV-Vis ($CHCl_3$): $\lambda_{max}$ (ε)=542 (31 000), 578 nm (48 500 M$^{-1}$ cm$^{-1}$); fluorescence ($CHCl_3$, excitation=542 nm): $\lambda_{max}$=613 nm, MS (FD, 8 kV): m/z=1080.2 (100%) [M$^+$]

Example 2

Preparation of N,N'-bis(2,6-diisopropylphenyl)-1,6,7,12-tetra(4-sulfonylphenoxy)-perylene-3,4:9,10-tetracarboxdiimide 2 g (1.9 mmol) of the compound prepared in example 1 were dissolved in 4 ml of concentrated sulfuric acid and stirred at room temperature (20° C.). for 12 h. The product was precipitated by addition of water, filtered and dried at 75° C. under reduced pressure.

M.P.>300° C.; $^1$H NMR (300 MHz, $CH_3OH$-$D_4$, 300 K): δ=7.91 (s, 4H), 7.59 (d, $^3J$=8.8 Hz, 8H), 7.17 (t, $^3J$=7.6 Hz, 2H), 6.88 (d, $^3J$=8.8 Hz, 8H), 2.45 (sept, $^3J$=Hz, 4H), 0.85 (d, $^3J$=Hz, 24H); $^{13}$C NMR (75 MHz, $CH_3OH$-$D_4$, 300 K): δ=164.61, 158.49, 156.94, 147.21, 142.46, 131.83, 129.49, 125.01, 124.43, 122.35, 121.86, 120.75, 30.29, 24.25, 13.40; IR (KBr): ν=2970, 2361, 1701, 1655, 1588, 1491, 1410, 1340, 1287, 1208, 1180, 1125, 1066, 1032, 1007, 882, 846, 699, 580 cm$^{-1}$; UV-Vis ($H_2O$): $\lambda_{max}$ (ε)=536 (20 100), 571 nm (27 800 M$^{-1}$ cm$^{-1}$); MS (LD-TOF): m/z=1401.1 [M$^+$]

Example 3

Preparation of N,N'-bis(2,6-diisopropylphenyl)-1,6,7,12-tetra(3-pyridoxy)perylene-3,4:9,10-tetracarboxdiimide 5 g (5.9 mmol) of N,N'-bis(2,6-diisopropylphenyl)-1,6,7,12-tetrachloroperylene-3,4:9,10-tetracarboxdiimide, 2.85 g (30 mmol) of hydroxypyridine and 4 g (30 mmol) of $K_2CO_3$ were dissolved in 250 ml of NMP. The reaction mixture was stirred at 110° C. under an inert gas atmosphere. After 4 h, the mixture was cooled to room temperature and neutralized with dilute hydrochloric acid. The crude product was filtered, washed with water and dried at 75° C. under reduced pressure. The resulting solid was further purified by column chromatography with ethyl acetate.

M.P.>300° C.; $^1$H NMR (250 MHz, $C_2D_2Cl_4$, 300 K): δ=8.29 (d, $^3J$=6.3 Hz, 4H), 8.28 (s, 4H), 8.14 (s, 4H), 7.35 (t, $^3J$=7.9 Hz, 2H), 7.30-7.27 (m, 4H), 7.19 (d, $^3J$=7.9 Hz, 4H), 7.17 (d, $^3J$=8.2 Hz, 4H), 2.58 (sept, $^3J$=6.6 Hz, 4H), 1.03 (d, $^3J$=6.6 Hz, 24H); $^{13}$C NMR (75 MHz, $C_2D_2Cl_4$, 300 K); δ=162.99, 155.52, 152.09, 146.32, 145.65, 141.97, 133.50, 130.29, 129.84, 127.30, 124.93, 124.33, 123.68, 121.38, 121.15, 120.49, 94.29, 29.35, 24.45, 16.32, 14.85; IR (KBr): ν=3061, 2963, 2868, 2361, 1707, 1671, 1593, 1508, 1474, 1423, 1407, 1339, 1309, 1279, 1209, 1102, 1019, 958, 875, 808, 738, 705, 581 cm$^{-1}$; UV-Vis ($CH_3OH$): $\lambda_{max}$ (ε)=526 (30 500), 560 nm (48 800 M$^{-1}$ cm$^{-1}$); fluorescence ($CH_3OH$, excitation: 526 nm): $\lambda_{max}$=610 nm; MS (FD, 8 kV): m/z (rel. int.)=1083.2 (100%) [M$^+$]

Example 4

Preparation of N,N'-bis(2,6-diisopropylphenyl)-1,6,7,12-tetra[3-(N-methyl-pyridinium)oxy]perylene-3,4:9,10-tetracarboxdiimide 1 g (0.92 mmol) of the compound prepared in example 3 was dissolved in 100 ml of methanol at 80° C. 655 mg (4.6 mmol) of methyl iodide were added to the stirred solution and the mixture was kept under reflux for 12 h. The resulting product fell in high purity.

M.P.>300° C.; $^1$H NMR (250 MHz, $CH_3OH$-$D_4$, 300 K): δ=9.22-9.01 (m, 2H), 8.78-8.42 (m, 12H), 8.12-7.97 (m, 2H), 7.88-7.68 (m, 2H), 7.57-7.33 (m, 8H), 4.47-4.40 (s, 12H), 2.91-2.69 (m, 4H), 1.15-1.11 (m, 24H); $^{13}$C NMR (75 MHz, $CH_3OH$-$D_4$, 300 K): δ=164.40, 164.26, 157.23, 157.05, 154.26, 153.88, 147.18, 146.61, 142.63, 138.61, 135.80, 131.58, 130.79, 130.06, 129.30, 126.65, 126.44, 125.13, 124.56, 121.62, 67.38, 30.30, 24.36, 13.42; IR (KBr): ν=2963, 2361, 2336, 1704, 1665, 1594, 1503, 1473, 1408, 1337, 1309, 1275, 1212, 812, 672 cm$^{-1}$; UV-Vis ($H_2O$): $\lambda_{max}$ (ε)=520 (19 300), 555 nm (25 700 M$^{-1}$ cm$^{-1}$); fluorescence ($H_2O$, excitation: 520 nm): $\lambda_{max}$=601 nm

Example 5

Preparation of Disubstituted Perylenetetracarboxdiimides

Starting from N,N'-bis(2,6-diisopropylphenyl)-1,7-dibromoperylene-3,4:9,10-tetracarboxdiimide, N,N'-bis(2,6-diisopropylphenyl)-1,7-di(4-sulfonylphenoxy)-perylene-3,4:9,10-tetracarboxdiimide was prepared according to the reaction sequence described in examples 1 and 2, and N,N'-bis(2,6-diisopropylphenyl)-1,7-di[3-(N-methylpyridinium)oxy]perylene-3,4:9,10-tetracarboxdiimide was prepared according to the reaction sequence described in examples 3 and 4.

REFERENCES (1) Y. Nagao and T. Misono, Dyes Pigm., 1984, 5, 171 A. Rademacher, S. Merkle and H. Lanhals, Chem. Ber. 1982, 115, 2927
(2) H. O. Loutfy, A. M. Hor, P. Kazmaier and M. Tam, J. Imaging Sci., 1989, 33, 151
(3) G. Seybold and G. Wagenblast, Dyes Pigm. 1989, 11, 303
(4) L. Schmidt-Mende, A. Fechtenkotter, K. Müllen, E. Moons, R. H. Friend, J. D. MacKenzie, Science, 2001, 293, 1119
(5) R. Gvishi, R. Reisfeld and Z. Bursheim, Chem. Phys. Lett., 1993, 213, 338
(6) WO 02/14414 A2
(7) H. Icil, D. Uzun and N. Pasaogullari, Spectrosc. Lett., 1998, 31, 667 S. Icil, S. Demic, B. Dindar, A. O. Doroshenko and C. Timur, J. Photochem. Photobiol., 2000, 136, 15 H. Quante, P. Schlichting, U. Rohr, Y. Geerts and K. Müllen, Macromol. Chem. Phys., 1996, 197, 4029 W. Bauer, D. Baumgart, D. Schnaltmann, K.-P. Kreutzer and W. Zöller, EP 0 832 937 B1 H.-A. Klok, J. Rodriguez Hernandez, S. Becker and K. Müllen, J. Polym. Sci., 2001, 39, 1572
(8) H. Han, R. J. Bennett and L. H. Hurley, Biochem. 2000, 39, 9311 N. V. Khromov-Borisov, M. L. Indenbom and A. F. Danilov, Pharm. Chem. J. 1980, 14, 90

The invention claimed is:

1. A perylenetetracarboxylic acid bisimide of the structural formula (I)

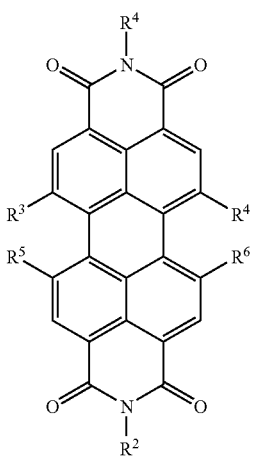

in which $R^1$ and $R^2$ are each independently an organic moiety which is bonded via a secondary or tertiary carbon atom to the imide nitrogen atom,
at least two of $R^3$, $R^4$, $R^5$ and $R^6$ are each independently organic moieties which contain at least one positively or negatively charged group, and
at least one of $R^3$, $R^4$, $R^5$ and $R^6$ has the general structural formula (IV):

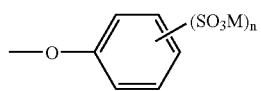

wherein $R^7$ is an optionally substituted $C_1$-$C_6$-alkyl moiety and Y is an anion.

2. The compound as claimed in claim 1, wherein $R^1$ or $R^2$ are secondary or tertiary aliphatic moieties or cyclic moieties.

3. The compound as claimed in claim 1, wherein $R^1$ or $R^2$ are aromatic or heteroaromatic moieties, in particular phenyl, pyridyl or naphthyl moieties, which optionally contain one or more substituents.

4. The compound as claimed in claim 1, wherein at least $R^3$, $R^4$, $R^5$ and $R^6$ are each independently an organic moiety which bears (in neutral media) a positively charged group.

5. The compound as claimed in claim 1, wherein $R^3$, $R^4$, $R^5$ and $R^6$ are each independently an organic moiety which bears a group selected from quaternary ammonium and N-alkylated heteroaromatic N-groups such as N-alkylpyridinium, N-alkylquinolinium or N-alkylisoquinolinium groups.

6. The compound as claimed in claim 1, wherein $R^3$, $R^4$, $R^5$ and $R^6$ are each independently an organic moiety which bears (in neutral media) a negatively charged group.

7. The compound as claimed in claim 1, wherein at least two of $R^3$, $R^4$, $R^5$ and $R^6$ are each independently an organic moiety which bears a group selected from $SO_3H$, COOH, $SO_3M$ and COOM, wherein M is a cation.

8. The compound as claimed in claim 1, wherein $R^3$, $R^4$, $R^5$ or $R^6$ comprise aromatic or heteroaromatic moieties, in particular phenyl or pyridine moieties.

9. The compound as claimed in claim 1, wherein at least one of $R^3$, $R^4$, $R^5$ and $R^6$ has the general structural formula (II):

in which Ar is an aromatic or heteroaromatic moiety which contains at least one charged group.

10. A process for preparing perylenetetracarboxdiimides of claim 1 comprising the steps of:
(a) reacting halogen-substituted perylenedi- or perylenetetracarboxdiimides of the general structural formula (V):

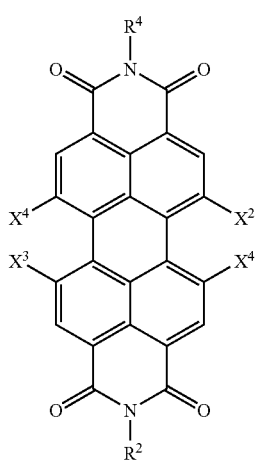

in which $R^1$ and $R^2$ are each as defined in claim 1 and at least two of $X^1$, $X^2$, $X^3$ and $X^4$ are each halogen, in particular Cl or Br, with a compound of the general structural formula (VI):

  (VI)

in which Ar' is an aromatic or heteroaromatic moiety to give tetrasubstituted perylenetetra-carboxdiimides of the general structural formula (VIIIa) or to give disubstituted perylene-tetra-carboxdiimides of the general structural formula (VIII):

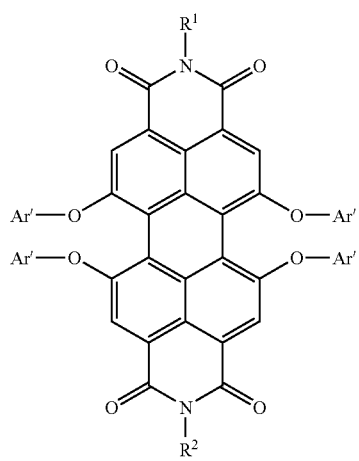 (VIIIa)

-continued

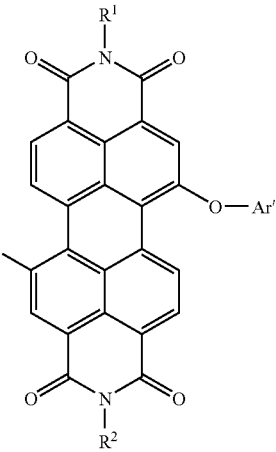 (VIIIb)

and
(b) introducing hydrophilic groups into the aromatic or heteroaromatic Ar' moieties.

11. The process as claimed in claim 10, wherein step (b) comprises the introduction of at least one $SO_3H$ or $SO_3M$ group into Ar', wherein M is a cation.

12. The process as claimed in claim 10, wherein step (b) includes the alkylation of at least one heteroaromatic nitrogen atom in Ar'.

\* \* \* \* \*

UNITED STATES PATENT AND TRADEMARK OFFICE
CERTIFICATE OF CORRECTION

PATENT NO.        : 7,799,919 B2
APPLICATION NO.   : 10/547521
DATED             : September 21, 2010
INVENTOR(S)       : Christopher Kohl, Jianqiang Qu and Klaus Müllen Page 1 of 1

It is certified that error appears in the above-identified patent and that said Letters Patent is hereby corrected as shown below:

At column 9, line 10, after "formula" delete "(VIII)'" and insert --(VIIIb)--.

Signed and Sealed this

Sixteenth Day of November, 2010

David J. Kappos
*Director of the United States Patent and Trademark Office*